Figure 1:
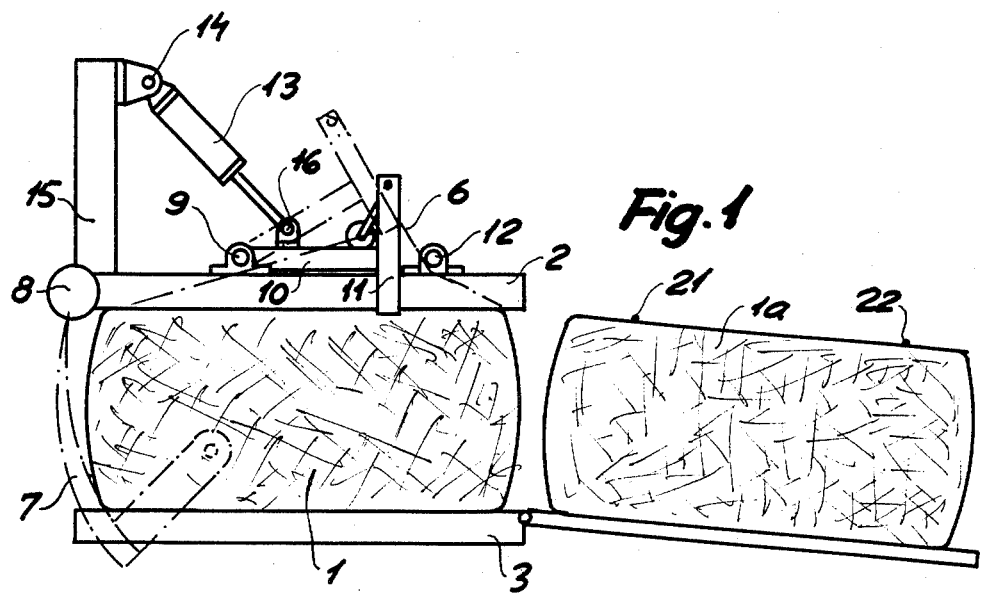

United States Patent [19]

Weidemann

[11] Patent Number: 4,577,553
[45] Date of Patent: Mar. 25, 1986

[54] APPARATUS FOR ATTACHMENT TO A BALER

[75] Inventor: Jørn U. Weidemann, Rudkøbing, Denmark

[73] Assignee: L. P. Weidemann & Sonner, Rudkøbing, Denmark

[21] Appl. No.: 592,118

[22] Filed: Mar. 22, 1984

[30] Foreign Application Priority Data

Mar. 22, 1983 [DK] Denmark ............... 1292/83

[51] Int. Cl.$^4$ ................................ B65B 13/28
[52] U.S. Cl. ......................... 100/4; 100/20; 100/31
[58] Field of Search .............. 100/3, 8, 19 R, 20, 100/29, 4, 30, 31, 21, 22, 23

[56] References Cited

U.S. PATENT DOCUMENTS

| | | | |
|---|---|---|---|
| 2,469,578 | 5/1949 | Ronning | 100/22 |
| 3,095,802 | 7/1963 | Nolt | 100/19 R |
| 3,224,363 | 12/1965 | Talbot | 100/3 |
| 3,448,680 | 6/1969 | Weber | 100/31 |
| 3,554,116 | 1/1971 | Smith | 100/31 |
| 3,895,571 | 7/1975 | Freeman | 100/4 |
| 4,120,238 | 10/1978 | Schafer et al. | 100/31 X |

Primary Examiner—Billy J. Wilhite
Attorney, Agent, or Firm—Ladas & Parry

[57] ABSTRACT

In the method of reducing twine tension in a bale (1) of straw in a baler in which the straw material is pressed under a high pressure, a plurality of windings of twine (6) is looped around and ties the straw material (1) while the material is subjected to the pressure.

To avoid twine bursts in the use of sisal twine instead of synthetic twine, the twine tension is reduced by moving the twine windings (6) away from the top face of the bale (1) prior to the knotting operation, and the twine windings (6) are then released after the knotting operation.

2 Claims, 2 Drawing Figures

APPARATUS FOR ATTACHMENT TO A BALER

The invention relates to a method of reducing twine tension in a bale of straw in a baler in which the straw material is pressed under a high pressure and, while said straw material is subjected to the pressure in the baler, a large number of twine windings is looped around said material by means of the same number of twine knotters, each of which ties a knot for each twine winding.

Normally, the twine used in the method of this type is a synthetic twine whose elongation at rupture is about 16%.

However, when the straw bales are to be used at cellulose works, it is required that the twine is sisal twine whose elongation at rupture is only about 5%. If the sisal twine is used in an ordinary baler, the expansion of the bale will cause the twine tension in the individual twine windings of the released bale to be so great that the twine bursts.

The object of the invention is to avoid twine bursts in the use of sisal twine instead of synthetic twine.

This object is achieved according to the invention in that the twine windings looped around the bale are moved away from at least part of the surface of the bale before the knotting operation, and the twine windings are then released after the knotting operation. The provision of an outward bend on the individual twine windings prior to knotting produces a twine elongation leading to reduced twine tension in the finished bale. In this context it should be mentioned that the finished bale tied with sisal twine by the method of the invention is not necessarily smaller but may be more compressed than a bale pressed in a conventional manner and tied with synthetic twine.

The invention also relates to apparatus for attachment to a baler for performing the method of the invention. This apparatus is characterized in that a plurality of gripper means, one for each twine winding, is secured to a gripper device which is rotatably journalled in the baler and is arranged to be moved, e.g. by means of a hydraulic or pneumatic mechanism, between a first position in which each gripper means is disposed at the top face of the bale where it can grip and retain a corresponding twine winding, and a second position in which each gripper means is disposed at a predetermined distance from the top face of the bale, each twine winding being released in said second position by a means for releasing each twine from the winding corresponding gripper means upon completion of the knotting operation.

Expediently, each gripper means consists of a bill whose one half is secured to the gripper device and, the other half being rotatably secured with respect to the first half and connected to the means for releasing each twine winding from its corresponding gripper means, which is adopted to open or close the bill.

In this embodiment all the gripper means can be operated simultaneously by means of the same hydraulic or pneumatic mechanism.

Figure 2:
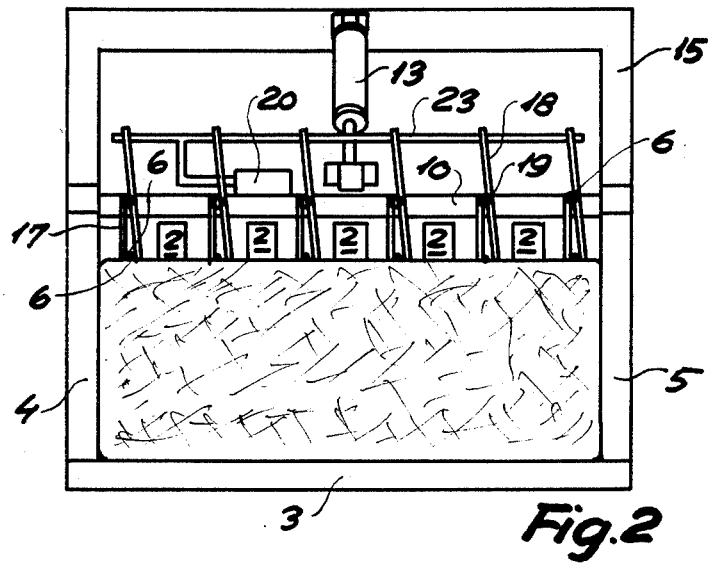

The invention will be described more fully below with reference to the drawing, in which FIG. 1 is a longitudinal section of a baler with apparatus according to the invention attached on it, and FIG. 2 is an end view of the baler.

The baler, which is known per se, is only shown in part in the drawing. It comprises a press channel for a straw bale 1 which is being produced. The press channel has four sides 2, 3, 4 and 5 which are pressed against the bale 1 from their respective sides by means of hydraulic cylinders (not shown), which thus determine the baling pressure. A large press plunger (not shown) operates on the left side of the bale 1, as seen in FIG. 1, moving the bale to the right in FIG. 1 against the frictional resistance from the four sides 2, 3, 4 and 5 of the press channel. The bale 1 to the left in FIG. 1 has reached the position where the very pressing process has been completed and twine tying takes place. The twine 6 has already been looped in six parallel windings around the longitudinal direction of the bale, but the knots of the twine windings have not been tied yet by means of conventional needles 7 in cooperation with twine knotters 8 which are likewise conventional.

The top side of the baler has attached to it apparatus which consists of a gripper device 10 mounted for rotation about a rod 9 and having a gripper means 11 for each of the six windings of twine 6.

The apparatus is shown partly in a first position in solid lines in which each gripper means 11 is disposed at the top side of the bale 1, it being possible for the gripper means to pass through or outside the profile sections forming the top side 2 of the press channel, and another position shown in dash-and-dot lines in which each gripper means 11 lifts a gripped twine winding 6 between the rod 9 and another rod 12 parallel with said first rod. A pneumatic cylinder device 13, whose one end 14 is secured in a bracket 15 on the baler and whose other end 16 is secured to the gripper device 10, controls the movement of the gripper device 10.

Each individual gripper means 11 is formed as a bill whose one half 17 is secured to the gripper device 10, while the other half 18 is rotatably secured at 19 with respect to the first half 17 and connected through a cross member 23 to another pneumatic cylinder device 20 common to all the six other halves 18 of the bills 11.

The shown apparatus operates in the manner that the individual bills 11 of the gripper device 10 grip their respective twine winding 6 in the solidline position of the gripper device 10 and lift these windings 6 up to the position shown in dash-and-dot lines, and then the twine knotters 8 in connection with the needles 7 perform the knotting designated 21 in the finished bale 1a to the right in FIG. 1. After tying of the knots 21 the twine 6 is released from the bills 17, 18 by means of the cylinder device 20. Immediately after this the twine knotters 8 then tie the first knots 22 in the next bale, not shown in the drawing, before the needles 7 leave the knotters 8. However, the knots 21, 22 are shown in the finished bale to the right in FIG. 1.

I claim:

1. For use with a baler for baling straw material with twine, having means for compressing bales of straw material under high pressure, and means for looping a plurality of twine bindings around each bale of compressed straw material by a corresponding plurality of twine knotters, each of which ties a knot for each twine binding;

apparatus for attachment to said baler for reducing twine tension in the twine bindings, comprising
(a) a gripper device (10) adapted to be rotatably journalled in said baler,
(b) a plurality of gripper means (11), one for each twine binding, secured to said gripper device (10),
(c) hydraulic or pneumatic mechanism (13) for moving said gripper device (10) between a first position in which each gripper means (11) is disposed at a top face of a bale of compressed straw material where it can grip and retain a corresponding twine binding, and a second position in which each gripper means (11) is disposed at a predetermined distance from said top face of the bale which the twine knotters operate, and (d) means (20) for releasing each twine winding from its corresponding gripper means (11) in said second position upon completion of the knotting operation.

2. Apparatus according to claim 1, which each gripper means (11) comprise a bill whose first half (17) is thereof secured to the gripper device (10), and a second half (18) rotatably secured to the first half (17) and connected to said means (20) which is adapted to open or close said bill.

* * * * *